(12) United States Patent
Song

(10) Patent No.: US 12,525,288 B2
(45) Date of Patent: Jan. 13, 2026

(54) SEMICONDUCTOR DEVICE WITH SELECTIVELY COUPLED RESISTORS IN CONDUCTION PATHS

(71) Applicant: SK hynix Inc., Icheon-si (KR)

(72) Inventor: Jeong Hwan Song, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 173 days.

(21) Appl. No.: 18/460,473

(22) Filed: Sep. 1, 2023

(65) Prior Publication Data

US 2024/0339155 A1  Oct. 10, 2024

(51) Int. Cl.
*G11C 13/00* (2006.01)

(52) U.S. Cl.
CPC ......... *G11C 13/003* (2013.01); *G11C 13/004* (2013.01); *G11C 13/0069* (2013.01)

(58) Field of Classification Search
CPC . G11C 13/003; G11C 13/004; G11C 13/0069; G11C 2013/0078; G11C 11/1675; G11C 13/0004; G11C 8/14; G11C 7/18; G11C 8/08; H10B 63/845; H10B 63/10; H10B 63/30; H10N 70/826; H10N 79/00
See application file for complete search history.

(56) References Cited

U.S. PATENT DOCUMENTS

| | | | |
|---|---|---|---|
| 2010/0202185 A1* | 8/2010 | Katoh | G11C 13/0069 365/189.16 |
| 2014/0051223 A1* | 2/2014 | Pramanik | G11C 13/0069 438/382 |
| 2020/0303462 A1* | 9/2020 | Pellizzer | H10B 63/80 |
| 2022/0084587 A1 | 3/2022 | Miyazaki | |

FOREIGN PATENT DOCUMENTS

KR  101986335 B1  6/2019

* cited by examiner

*Primary Examiner* — Jerome Leboeuf
(74) *Attorney, Agent, or Firm* — Perkins Coie LLP

(57) ABSTRACT

A semiconductor device includes: a memory cell array including a plurality of first conductive lines extending in a first direction, a plurality of second conductive lines extending in a second direction, and a plurality of memory cells disposed at intersections between the first conductive lines and the second conductive lines; a first driver coupled to the first conductive lines and configured to drive the first conductive lines; a second driver coupled to the second conductive lines and configured to drive the second conductive lines; a first resistor coupled in series to each of the first conductive lines and between the first driver and the first conductive lines; and a first switching element coupled in a conductive path that is in parallel to the first resistor and is between the first driver and the first conductive lines and operable to turn on or off the conductive path.

18 Claims, 12 Drawing Sheets

SEMICONDUCTOR DEVICE WITH SELECTIVELY COUPLED RESISTORS IN CONDUCTION PATHS

CROSS-REFERENCE TO RELATED APPLICATIONS

This patent document claims the priority and benefits of Korean Patent Application No. 10-2023-0045425, filed on Apr. 6, 2023, which is incorporated herein by reference in its entirety.

TECHNICAL FIELD

The technology disclosed in this patent relates to a semiconductor device, and more particularly to a semiconductor device including memory cells including a selector, and a method for fabricating the semiconductor device.

BACKGROUND

With the recent trends toward miniaturization, low power consumption, and high performance in the electrical and electronics industry, many semiconductor manufacturers are directing their efforts toward the development of new types of semiconductor devices.

Examples of such new types of semiconductor devices include a semiconductor device that can store data by switching between different resistance states according to an applied voltage or current, such as a Resistive Random Access Memory (RRAM) or a Phase-change Random Access Memory (PRAM), a Ferroelectric Random Access Memory (FRAM), a Magnetic Random Access Memory (MRAM), an e-fuse, and others.

SUMMARY

Embodiments of the disclosed technology relate to a semiconductor device capable of reducing and/or preventing an operation failure of a memory cell.

In an embodiment of the disclosed technology, a semiconductor device includes: a memory cell array including a plurality of first conductive lines extending in a first direction, a plurality of second conductive lines extending in a second direction, and a plurality of memory cells disposed at intersections between the first conductive lines and the second conductive lines; a first driver coupled to the first conductive lines and configured to drive the first conductive lines; a second driver coupled to the second conductive lines and configured to drive the second conductive lines; a first resistor coupled in series to each of the first conductive lines and between the first driver and the first conductive lines; and a first switching element coupled in a conductive path that is in parallel to the first resistor and is between the first driver and the first conductive lines and operable to turn on or off the conductive path.

In another embodiment of the disclosed technology, a semiconductor device includes: a memory cell array including a plurality of first conductive lines extending in a first direction, a plurality of second conductive lines extending in a second direction, and a plurality of memory cells disposed at intersections between the first conductive lines and the second conductive lines, each memory cell including a selector layer; and a first resistor selectively coupled to an end of each of the first conductive lines according to an operation mode.

DETAILED DESCRIPTION

Some embodiments of the disclosed technology will be described below in more detail with reference to the accompanying drawings.

The drawings are not necessarily to scale, and in some instances, proportions may have been exaggerated in order to clearly illustrate features of the embodiments. When a first layer is referred to as being "on" a second layer or "on" a substrate, it not only refers to a case where the first layer is formed directly on the second layer or the substrate but also a case where a third layer exists between the first layer and the second layer or the substrate.

Figure 1A:
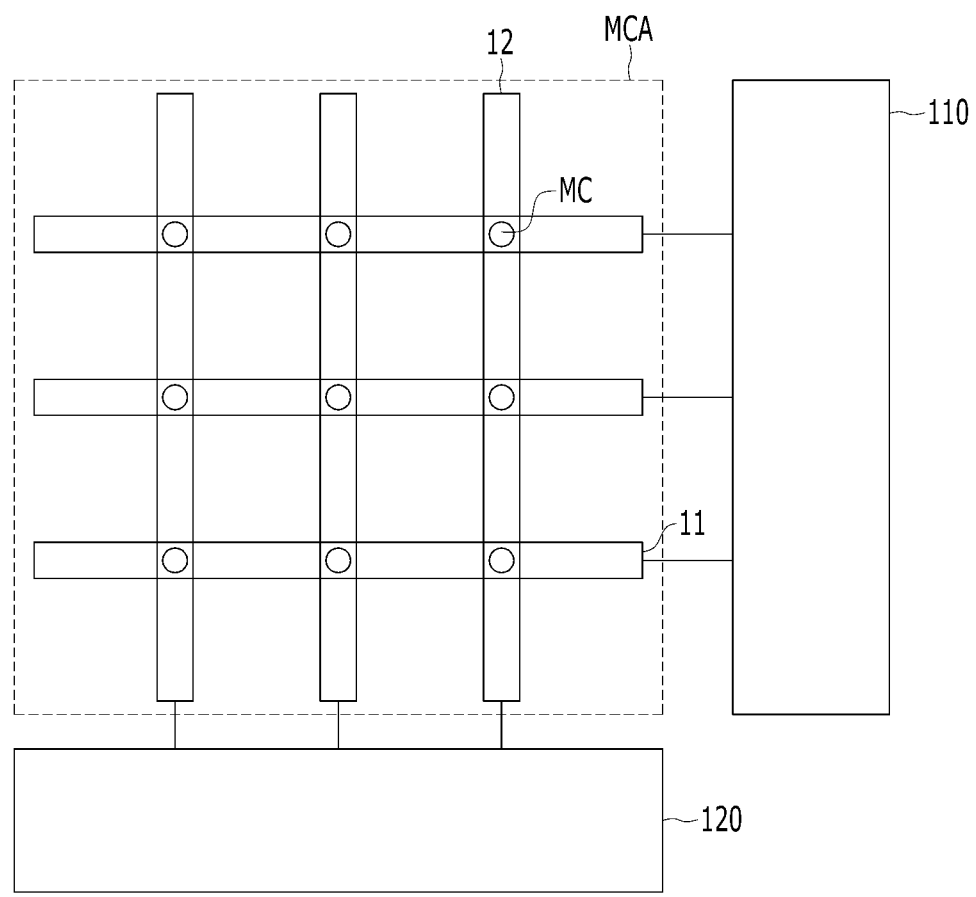
FIG. 1A illustrates an example configuration of a semiconductor device based on an embodiment of the disclosed technology.
Figure 1B:
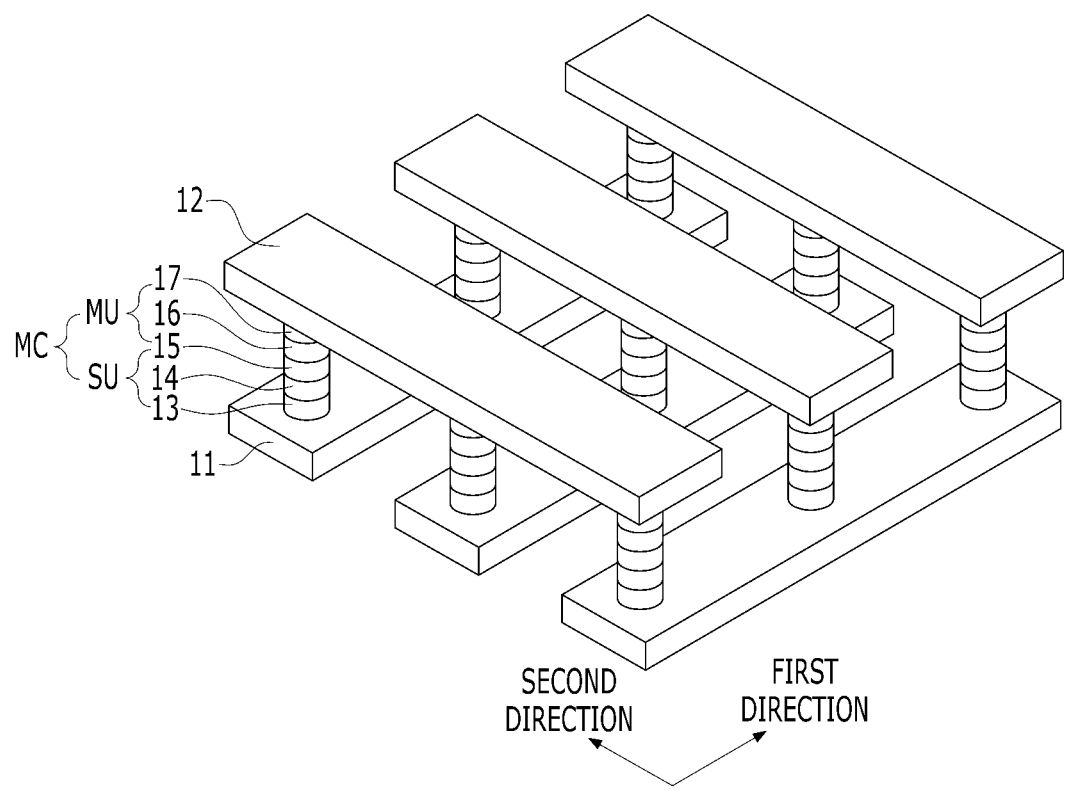
FIG. 1B is a perspective view illustrating an example of a memory cell array of the semiconductor device shown in FIG. 1A.

FIG. 1A illustrates an example configuration of a semiconductor device based on an embodiment of the disclosed technology. FIG. 1B is a perspective view illustrating an example of a memory cell array of the semiconductor device shown in FIG. 1A.

Referring to FIGS. 1A and 1B, the semiconductor device based on an embodiment of the disclosed technology may include a memory cell array MCA including a plurality of first conductive lines 11 extending in a first direction in parallel to each other, a plurality of second conductive lines 12 extending in a second direction in parallel to each other, and a plurality of memory cells MC interposed between the first conductive lines 11 and the second conductive lines 12, a first driver 110 coupled to the first conductive lines 11 to apply an electrical signal to drive or activate the first conductive lines 11, a second driver 120 coupled to the second conductive lines 12 to apply an electrical signal to drive or activate the second conductive lines 12. Each of the first driver 110 and the second driver 120 can drive each conductive line individually so that the first driver 110 and the second driver 120 can select one of the memory cells at an intersection of the conductive lines 11 and 22 to perform write or read operation with that selected memory cell. When viewed from above, the plurality of first conductive lines 11 extending in the first direction and the second conductive lines 12 extending in the second direction intersect at intersections where memory cells MC are disposed.

The first driver 110 may select one among the first conductive lines 11 in response to an address and supply or apply a desired or required first voltage or current to the selected first conductive line 11 so that memory cells coupled to the selected first conductive line 11 receive this first applied voltage. The second driver 120 may select one among the second conductive lines 12 in response to an address and supply or apply a desired or required second voltage or current to the selected second conductive line 12 so that memory cells coupled to the selected second conductive line 12 receive this applied second voltage. As a result, the confluence or collective effect of the application of the first applied voltage and second applied voltage causes a selected memory cell MC that is coupled to the selected first conductive line 11 and the selected second conductive line 12 to drive or activate the memory cell MC to perform desired operations (e.g., read and write operations) at the selected memory cell MC. When the first conductive line 11 and the second conductive line 12 function as a word line and a bit line, respectively, the first driver 110 and the second driver 120 may respectively correspond to a word line driver and a bit line driver. Alternatively, when the first conductive line 11 and the second conductive line 12 function as a bit line and a word line, respectively, the first driver 110 and the second driver 120 may correspond to a bit line driver and a word line driver, respectively.

The first conductive line 11 may be coupled to an end of the memory cell MC and the second conductive line 12 may be coupled to another end of the memory cell MC. In an embodiment of the disclosed technology, the first conductive line 11 and the second conductive line 12 may be spaced apart from each other in the vertical direction. In one example, as shown in FIG. 1B, the first conductive line 11 may be disposed below the second conductive line 12. In another example, the first conductive line 11 may be disposed above the second conductive line 12. In some implementations, the first conductive line 11 and the second conductive line 12 are spaced apart from each other in a third direction intersecting with the first and second directions, and the memory cell MC is disposed in a space between the first conductive line 11 and the second conductive line 12. For example, the first conductive line 11 and the second conductive line 12 may be spaced apart from each other in the horizontal direction while extending in the vertical direction. One of the first conductive line 11 and the second conductive line 12 may function as a word line and the other of the first conductive line 11 and the second conductive line 12 may function as a bit line. The first conductive line 11 and the second conductive line 12 may include one or more conductive materials. For example, the first conductive line 11 and the second conductive line 12 may include a metal such as platinum (Pt), tungsten (W), aluminum (Al), copper (Cu), tantalum (Ta), titanium (Ti) and others, a metal nitride such as titanium nitride (TiN), tantalum nitride (TaN) and others, or a combination thereof.

The memory cell MC may have a columnar shape and may be disposed between the first conductive line 11 and the second conductive line 12 at an intersection area at which the first conductive line 11 and the second conductive line 12 intersect when viewed from above. In an embodiment of the disclosed technology, the memory cell MC may have a planar circular shape. However, the disclosed technology are not limited thereto, and the memory cell MC may have any shape other than the columnar shape and the planar shape. In one example, the memory cell MC may have an elliptical shape. In another example, the memory cell MC may have a rectangular pillar shape whose sidewalls in the first direction are aligned with the second conductive line 12 and sidewalls in the second direction are aligned with the first conductive line 11 by patterning the memory cell MC together with the first conductive line 11 and the second conductive line 12.

The memory cell MC may include a memory unit MU that stores data, and a selection element unit SU that controls access to the memory unit MU. For example, the memory cell MC may include a stacked structure of a plurality of layers including a lower electrode layer 13, a selector layer 14, an intermediate electrode layer 15, a variable resistance layer 16, and an upper electrode layer 17. In some implementations, the selection element unit SU may include a lower electrode layer 13, a selector layer 14, and an intermediate electrode layer 15, and the memory unit MU may include the intermediate electrode layer 15, the variable resistance layer 16, and the upper electrode layer 17. The intermediate electrode layer 15 may be shared by the selection element unit SU and the memory unit MU.

The lower electrode layer 13 may be disposed at one end of the memory cell MC and the upper electrode layer 17 may be disposed at another end of the memory cell MC. For example, the lower electrode layer 13 and the upper electrode layer 17 may be disposed at bottom and top ends of the memory cell MC that has a vertical stack structure. In some implementations, the lower electrode layer 13 and the upper electrode layer 17 may function to transfer the voltage or current required for the operation of the memory cell MC. The intermediate electrode layer 15 may function to electrically connect the selector layer 14 to the variable resistance layer 16 while the selector layer 14 and the variable resistance layer 16 are physically separated from each other. The lower electrode layer 13, the intermediate electrode layer 15, and the upper electrode layer 17 may include one or more conductive materials. For example, the lower electrode layer 13, the intermediate electrode layer 15, and/or the upper electrode layer 17 may include a metal such as platinum (Pt), tungsten (W), aluminum (Al), copper (Cu), tantalum (Ta), titanium (Ti) and others, a metal nitride such as titanium nitride (TiN), tantalum nitride (TaN) and others, or a combination thereof. Alternatively, the lower electrode layer 13, the intermediate electrode layer 15, or the upper electrode layer 17 may include a carbon electrode.

The selector layer 14 may function to prevent current leakage that may occur between the memory cells MC sharing the first conductive line 11 or the second conductive line 12. To this end, the selector layer 14 may have a threshold switching characteristic by exhibiting two different conductive states, an off-state or non-conductive state that allows no (or very little) current to flow through the selector layer 14 (e.g., blocks the current to pass through) when a voltage applied to the selector layer 14 is less than a predetermined threshold voltage and an on-state or conductive state that allows a current to flow through the selector layer 14 and to rapidly increase when the applied voltage exceeds the threshold voltage. The selector layer 14 may include an Ovonic Threshold Switching (OTS) material, such as a diode and a chalcogenide-based material, a Mixed Ionic Electronic Conducting (MIEC) material, such as a metal-containing chalcogenide-based material, a Metal Insulator Transition (MIT) material, such as NbO2 and VO2, or a tunneling dielectric material having a relatively wide band gap, such as SiO2 and Al2O3. Alternatively, the selector layer 14 may include a dielectric material that is doped with a dopant. In some implementations, the dielectric material may include a silicon-containing dielectric material, such as silicon oxide, silicon nitride, or silicon oxynitride, a dielectric metal oxide, a dielectric metal nitride, or a combination thereof. The dopant may serve to create trap sites that trap or capture conductive carriers migrating in the dielectric material or provide a path through which the captured conductive carriers migrate again. To form the trap sites, one or more dopants can be doped to generate an energy potential capable of accommodating a conductive carrier in a dielectric material. For example, when the dielectric material contains silicon, the dopant may include a metal having a different valence from the valence of silicon, such as gallium (Ga), boron (B), indium (In), phosphorus (P), arsenic (As), antimony (Sb), germanium (Ge), carbon (C), tungsten (W), or a combination thereof. Alternatively, when the dielectric material contains a metal, the dopant may include a metal having a different valence from the metal, silicon, or others. For example, the selector layer 14 may include silicon dioxide (SiO2) that is doped with arsenic (As). When a voltage whose level is equal to or higher than the level of the threshold voltage is applied to the selector layer 14 including a dielectric material doped with a dopant, conductive carriers may migrate through the trap sites, so that an on-state in which current flows through the selector layer 14 may be realized. When the voltage applied to the selector layer 14 is reduced below the threshold voltage, the selector layer 14 may exhibit an off-state in which no current flows because no conductive carriers move.

The variable resistance layer 16 may function to store data in the memory cell MC. To this end, the variable resistance layer 16 may store different data by switching between different resistance states according to a voltage applied thereto. The variable resistance layer 16 may include a single-layer structure or a multi-layer structure including one or more materials that may be used in RRAM, PRAM, FRAM, MRAM and the like. For example, the variable resistance layer 16 may include a metal oxide such as transition metal oxides and perovskite-based materials, a phase change material such as chalcogenide-based materials, a ferroelectric material, a ferromagnetic material, and the like.

However, the structure of the memory cell MC is not limited the staked structure including a plurality of layers, and the stacking order of the layers may be different from what is discussed above or at least a portion of the stacked layers may be omitted. For example, one or more of the lower electrode layer 13, the intermediate electrode layer 15, and the upper electrode layer 17 may be omitted, or the order of the selector layer 14 and the variable resistance layer 16 may be reversed. Alternatively, for example, the memory cell MC may further include one or more layers (not shown) for improving the processes or characteristics. Alternatively, another data storage layer capable of storing different data according to the voltage or current applied to both ends of the memory cell MC may be used instead of the variable resistance layer 16.

Figure 2:
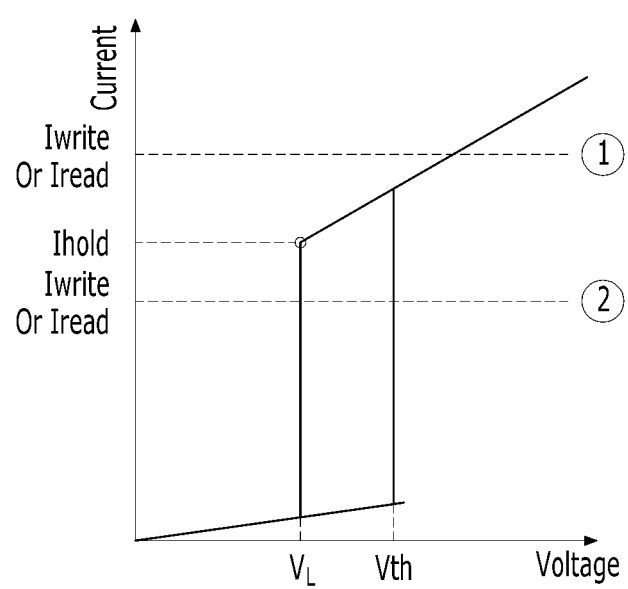
FIG. 2 is a current-voltage graph illustrating an operation of a selector layer included in the memory cell of FIGS. 1A and 1B.

FIG. 2 is a current-voltage graph illustrating an operation of the selector layer included in the memory cell of FIGS. 1A and 1B.

Referring to FIG. 2, when the voltage applied to the selector layer gradually increases and reaches the threshold voltage Vth, the selector layer, which is in the off-state before the applied voltage reaches the threshold voltage Vth, may be turned on to be in the on-state and a current may flow through the selector layer abruptly.

Once the selector layer is turned on, the selector layer may maintain the on-state even when the voltage that initially increases to be at or greater than the threshold voltage Vth subsequently reduces to at a voltage lower than the threshold voltage Vth by a predetermined level and is above a certain lower voltage limit $V_L$. However, when the voltage applied to the selector layer is lowered below this lower voltage limit $V_L$ for maintaining the on-state, the selector layer may be turned off again. In some implementations, the term "hold current" (Ihold) can be used to indicate the current flowing at a moment when the selector layer is turned off when the voltage decreases below the lower voltage limit $V_L$. In other words, the hold current Ihold may refer to a minimum current flowing through the selector layer that is needed or required to maintain the selector layer in the on-state.

In some implementations the term "write operation" may be used to indicate storing data in a memory cell, e.g., changing or switching the resistance state of the variable resistance layer. In some implementations, the term "read operation" may be used to indicate reading data from a memory cell, e.g., reading or detecting the resistance state of the variable resistance layer. In some implementations, the term "write current" (Iwrite) may be used to indicate the current flowing through the memory cell when a write voltage is applied to the memory cell for a write operation. In some implementations, the term "read current" (Iread) may be used to indicate a current flowing through the memory cell when a read voltage is applied to the memory cell for a read operation.

In some implementations, when the write current Iwrite or the read current Iread is greater than the hold current Ihold (see ① in FIG. 2), the selector layer may be turned on at the corresponding write current Iwrite or read current Iread. On the other hand, when the write current Iwrite or the read current Iread is smaller than the hold current Ihold (see ② in FIG. 2), there may be an occurrence of an oscillation phenomenon in which the state of the selector layer repeatedly switches between the on-state and the off-state at the write current Iwirte or the read current Iread, as will be discussed with reference to FIGS. 3A and 3B.

Figure 3A:
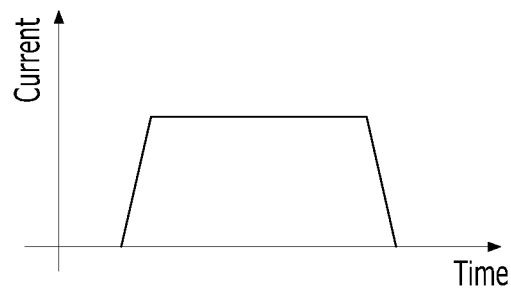
FIGS. 3A and 3B are current-time graphs illustrating an operation of the selector layer included in the memory cell of FIGS. 1A and 1B.
Figure 3B:
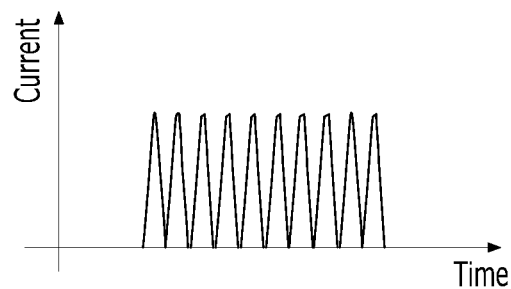

FIGS. 3A and 3B are current-time graphs illustrating an operation of the selector layer included in the memory cell of FIGS. 1A and 1B. FIG. 3A shows a case where the write current or the read current is greater than the hold current shown in FIG. 2. FIG. 3B shows a case where the write current or the read current is smaller than the hold current.

Referring to FIG. 3A, the selector layer is maintained in the on-state and the current flowing through the selector layer is maintained at a substantially constant level.

On the other hand, referring to FIG. 3B, the current flowing through the selector layer is abruptly changed and the state of the selector layer repeatedly switches between the on-state and the off-state. In this case, a stable write operation and read operation may not be performed.

The disclosed technology can be implemented in some embodiments to reduce the hold current lower than the write current and the read current.

In some embodiments of the disclosed technology, the hold current of the selector layer may be reduced by using a resistor coupled to the selector layer, so that the hold current is lower than the write current and the read current.

The operation performed when the selector layer is coupled to the resistor will be described below with reference to FIG. 4.

Figure 4:
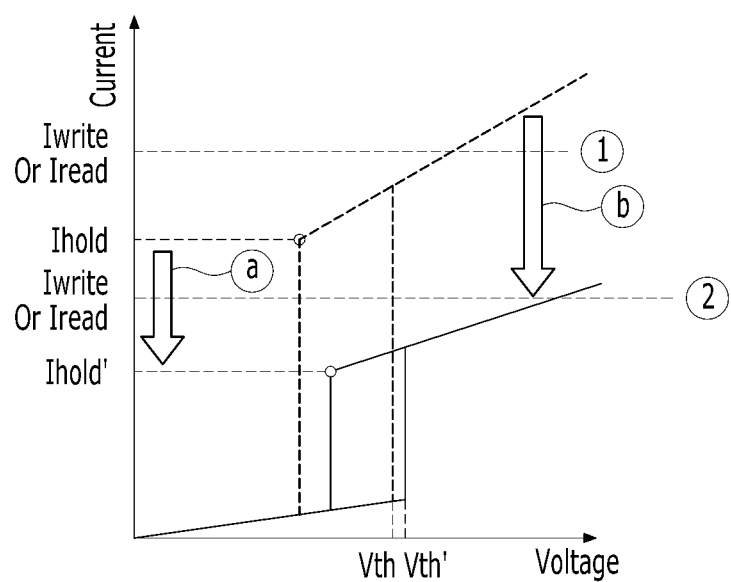
FIG. 4 is a current-voltage graph illustrating an operation when the selector layer of the memory cell of FIGS. 1A and 1B is coupled to a resistor.

FIG. 4 is a current-voltage graph illustrating an operation when the selector layer of the memory cell of FIGS. 1A and 1B is coupled to the resistor. For the sake of convenience in description, the graph of FIG. 2 is shown with a dotted line in FIG. 4.

Referring to FIG. 4, when the selector layer is coupled to the resistor, the current flowing through the selector layer while the selector layer is in the on-state (hereinafter referred to as "on-current") may be decreased and the overall current may be small compared to the graph of FIG. 2. As a result of voltage divider effects, the resistor may reduce an overshooting current generated when the selector layer is turned on, thereby reducing the size and/or width of the conductive path in the selector layer. When the size and/or width of the conductive path are/is decreased, the hold current, which is the minimum current required to maintain the conductive path of the selector layer, may be decreased as well. As a result, the hold current Ihold' of the selector layer coupled to the resistor may be lower than the hold current Ihold of the graph of FIG. 2 (see arrow ⓐ). In this case, not only when the write current Iwirte or the read current Iread is relatively large (see ①) but also when the write current Iwirte or the read current Iread is relatively small (see ②), the hold current Ihold' may be smaller than the write current Iwirte or the read current Iread. As a result, the aforementioned oscillation phenomenon may be prevented.

However, when the selector layer is coupled to the resistor, the on-current of the selector layer may also be decreased, and the on-current in FIG. 4 is smaller than the on-current in FIG. 2 (see arrow ⓑ). In this case, however, the resistor may render the current following to the memory cell insufficient. In addition, if the write current Iwrite is generally greater than the read current Iread, it is difficult to provide a sufficient write current, causing a failure in a write operation.

The disclosed technology can be implemented in some embodiments to provide a semiconductor device capable of preventing or reducing a failure of a write operation while preventing or reducing the oscillation phenomenon of the selector layer, as will be discussed below.

Figure 5:
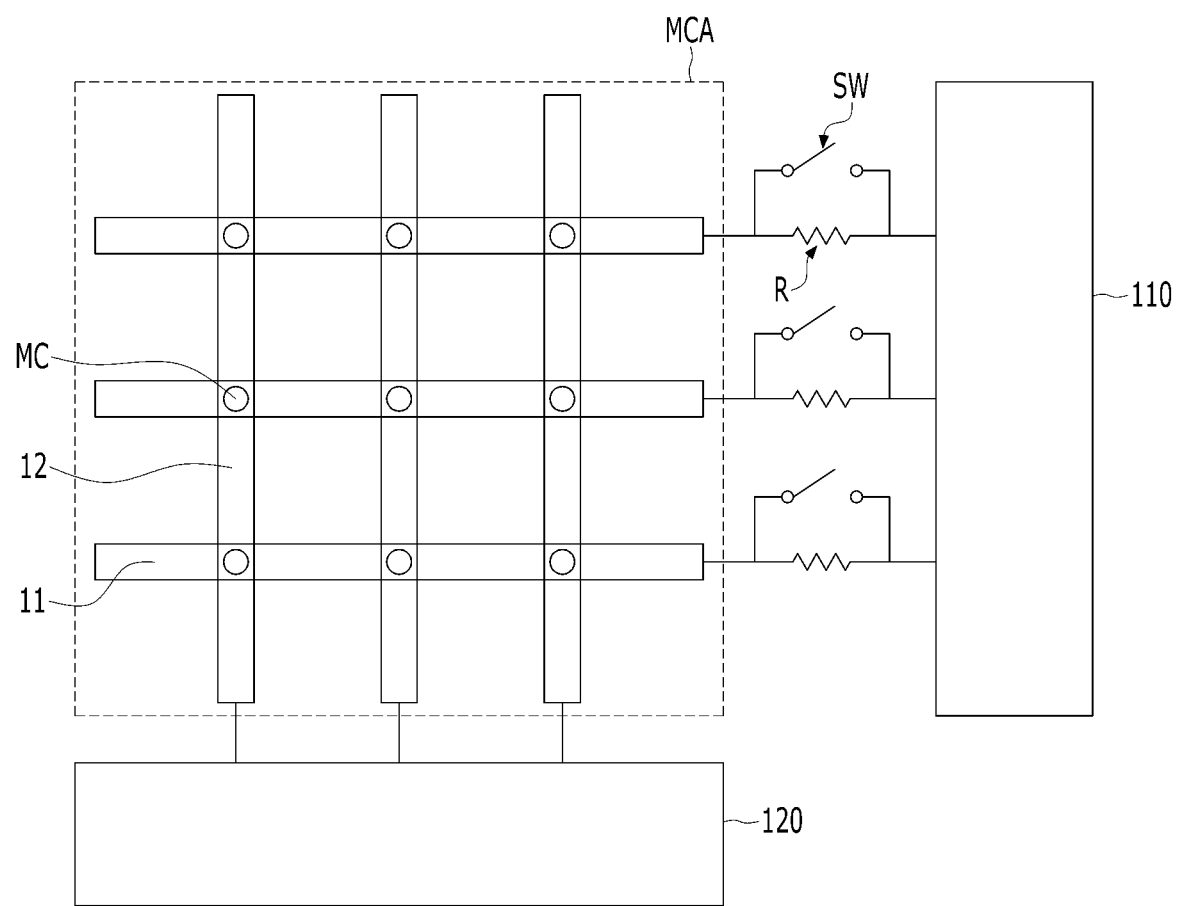
FIG. 5 illustrates a semiconductor device based on another embodiment of the disclosed technology.

FIG. 5 illustrates a semiconductor device based on an embodiment of the disclosed technology. In some implementations, the same reference numerals can be used to indicate constituent elements that are identical or similar to those of the semiconductor device of FIGS. 1A and 1B described above.

Referring to FIG. 5, the semiconductor device implemented based on an embodiment of the disclosed technology may include a memory cell array MCA including a plurality of first conductive lines 11 extending in the first direction in parallel to each other, a plurality of second conductive lines 12 extending in the second direction in parallel to each other, and a plurality of memory cells MC interposed between the first conductive lines 11 and the second conductive lines 12, a first driver 110 coupled to the first conductive lines 11 to activate the first conductive lines 11, a second driver 120 coupled to the second conductive lines 12 to activate the second conductive lines 12, a plurality of resistors R respectively coupled to the first conductive lines 11 in series, between the first conductive lines 11 and the first driver 110, and a plurality of switching elements SW respectively coupled in parallel to the resistors R between the first conductive lines 11 and the first driver 110. When viewed from above, the plurality of first conductive lines 11 extending in the first direction and the second conductive lines 12 extending in the second direction intersect at intersections where memory cells MC are disposed.

In some implementations, the resistors R may have a substantially fixed resistance value, and the resistors R may have a greater resistivity than the first conductive lines 11. For example, the resistors R may include a conductive material, such as a metal or a metal alloy, a silicon-containing dielectric material, such as silicon oxide, silicon nitride, or silicon oxynitride, a dielectric metal oxide, or a dielectric metal nitride. When the resistors R include a conductive material, they may include a conductive material having a higher resistivity than the first conductive lines 11. For example, when the first conductive lines 11 include tungsten (W), the resistors R may include titanium nitride (TiN) or tungsten silicon nitride (WSiN). When the resistors R include a dielectric material, the resistors R may include a dielectric material having a thin thickness of several to tens of Å and capable of letting a current flow at an operating voltage of the memory cells MC. However, the disclosed technology is not limited thereto, and one or more materials having a higher resistivity than the first conductive lines 11 may be used as the resistors R.

In some implementations, each of the switching elements SW may be coupled in parallel to its corresponding resistor R. In one example, a first terminal of each resistor R may be coupled to an end of its corresponding first conductive line 11, and a second terminal of the resistor R may be coupled to the first driver 110, and each switching element SW is coupled in parallel to its corresponding resistor R such that a first terminal of the switching element SW is coupled to the first terminal of each resistor R and a second terminal of the switching element SW is coupled to the second terminal of the resistor R. As an example, each switching element may be controlled by the first driver 110. That is, each switching element may be turned on or turned off by a signal from the first driver 110. The switching element SW may include one or more elements that may be selectively turned on or off depending on the operation of the semiconductor device. For example, the switching element SW may include a transistor, a diode, or others.

In the semiconductor device, when the switching element SW is turned off, the first conductive line 11 may be coupled in series to the resistor R and may be coupled to the first driver 110 through the resistor R. Thus, the voltage or current supplied through the first driver 110 may be transferred to the first conductive lines 11 through the resistors R. As a result, the hold current of the selector layer of the memory cell MC, which is coupled to the first conductive line 11, may be decreased.

On the other hand, when the switching element SW is turned on, the electrical connection between the first conductive lines 11 and the resistor R may be cut off, and the first conductive lines 11 become coupled to the first driver 110 through the switching element SW. Thus, the voltage or current provided through the first driver 110 may be transferred to the first conductive line 11 through the switching element SW. As a result, the hold current of the selector layer of the memory cell MC, which is coupled to the first conductive line 11, may be substantially maintained.

In this way, the hold current of the selector layer when the switching element SW is turned off may be less than the hold current of the selector layer when the switching element SW is turned on.

In an embodiment of the disclosed technology, the hold current of the selector layer may vary by selectively turning on or off the switching element SW according to the operation mode of the semiconductor device, as will be discussed below with reference to FIGS. 6A to 7B.

Figure 6A:
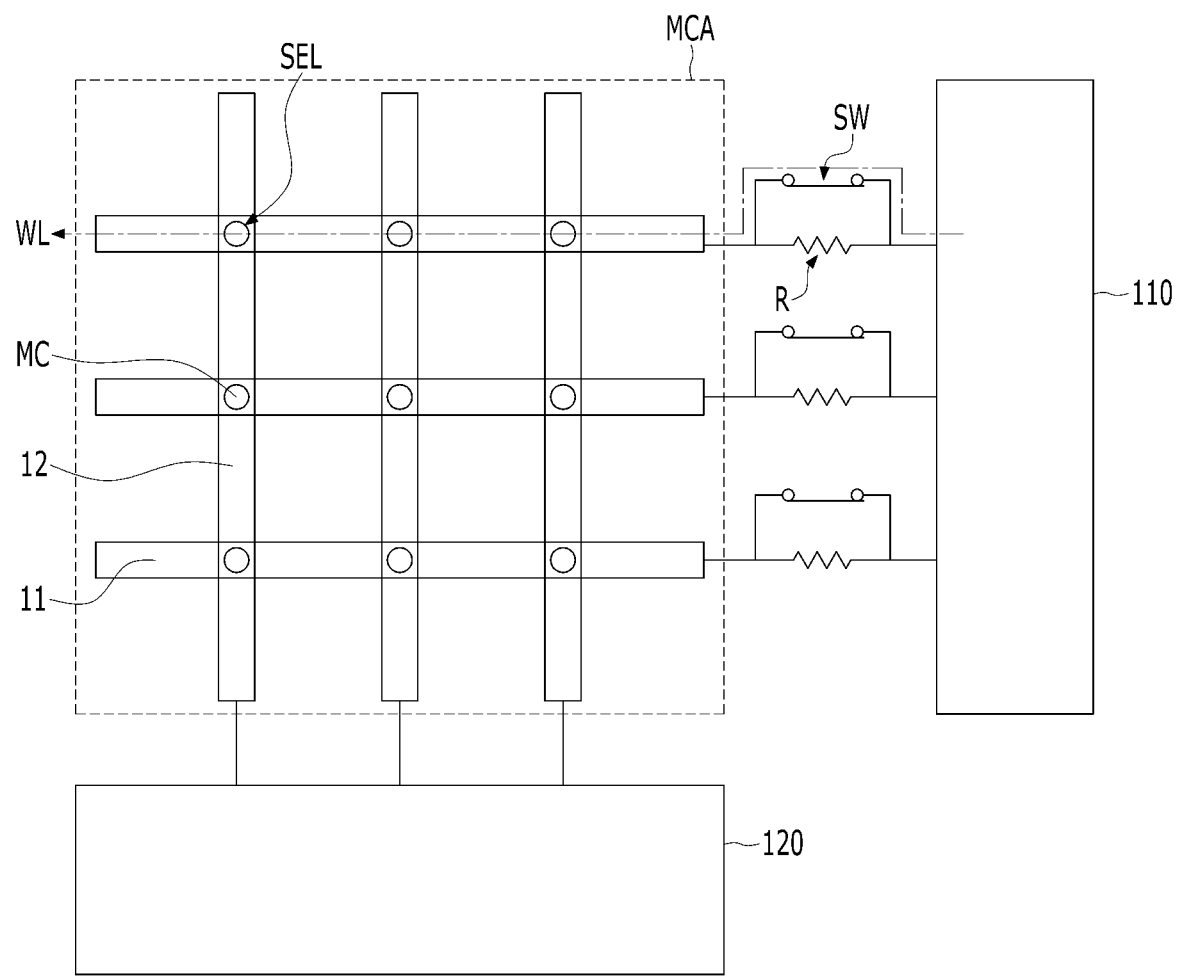
FIG. 6A illustrates a write operation for a selected memory cell in the semiconductor device shown in FIG. 5.
Figure 6B:
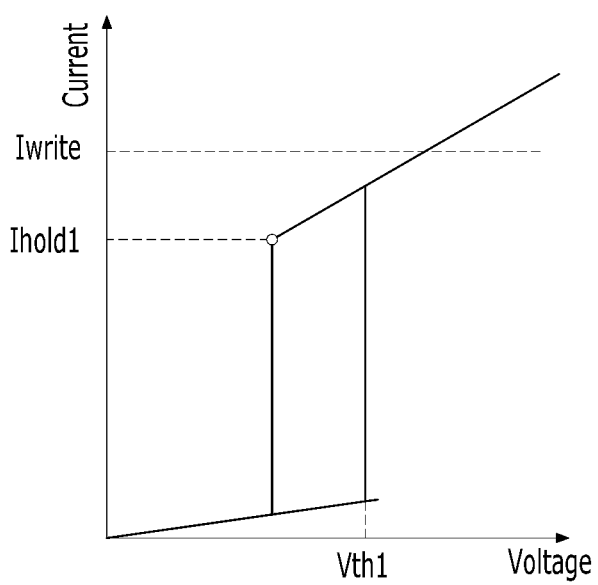
FIG. 6B is a current-voltage graph illustrating an operation of a selector layer of the selected memory cell during the write operation shown in FIG. 6A.

FIG. 6A illustrates a write operation for a selected memory cell in the semiconductor device shown in FIG. 5. FIG. 6B is a current-voltage graph illustrating the operation of the selector layer of the selected memory cell during the write operation illustrated in FIG. 6A.

Referring to FIG. 6A, the memory cell MC coupled to a selected first conductive line 11 and a selected second conductive line 12 may be referred to as a selected memory cell SEL. For example, it is assumed that the uppermost first conductive line 11 is a selected first conductive line 11 and the leftmost second conductive line 12 is a selected second conductive line 12. In this case, during a write operation for the selected memory cell SEL, a write voltage may be applied through the uppermost first conductive line 11 and the leftmost second conductive line 12. For example, the write voltage may be applied to the selected memory cell MC by applying a voltage corresponding to half of the write voltage to the uppermost first conductive line 11 and applying a voltage corresponding to half of the write voltage to the leftmost second conductive line 12. A ground voltage may be applied to the remaining first conductive lines 11 and the remaining second conductive lines 12 so that a write operation may not be performed on the remaining memory cells MC.

In some implementations, the switching element SW coupled to the uppermost first conductive line 11 may be turned on. Accordingly, a current may flow between the first driver 110 and the uppermost first conductive line 11 through the switching element SW. In this case, since the selector layer of the selected memory cell SEL coupled to the uppermost first conductive line 11 is not coupled to the resistor R, the hold current may be maintained.

In some implementations, the switching elements SW coupled to the remaining first conductive lines 11 may also be turned on to apply the ground voltage to the remaining first conductive lines 11 that are not selected.

Referring to FIG. 6B, since the selected memory cell is not coupled to the resistor, current-voltage characteristics are similar to those shown in FIG. 2. In other words, a relatively large first hold current Ihold1 and on-current may be shown.

Since the write current Iwrite generally has a greater value, for example, a value greater than the read current, it may have a greater value than the hold current without decreasing the hold current. In other words, the write current Iwrite may have a greater value than the first hold current Ihold1. Therefore, the oscillation phenomenon of the selector layer may be prevented or reduced during a write operation for the selected memory cell. Also, since the on-current of the selector layer does not decrease, the failure of the write operation may be prevented or reduced.

Figure 7A:
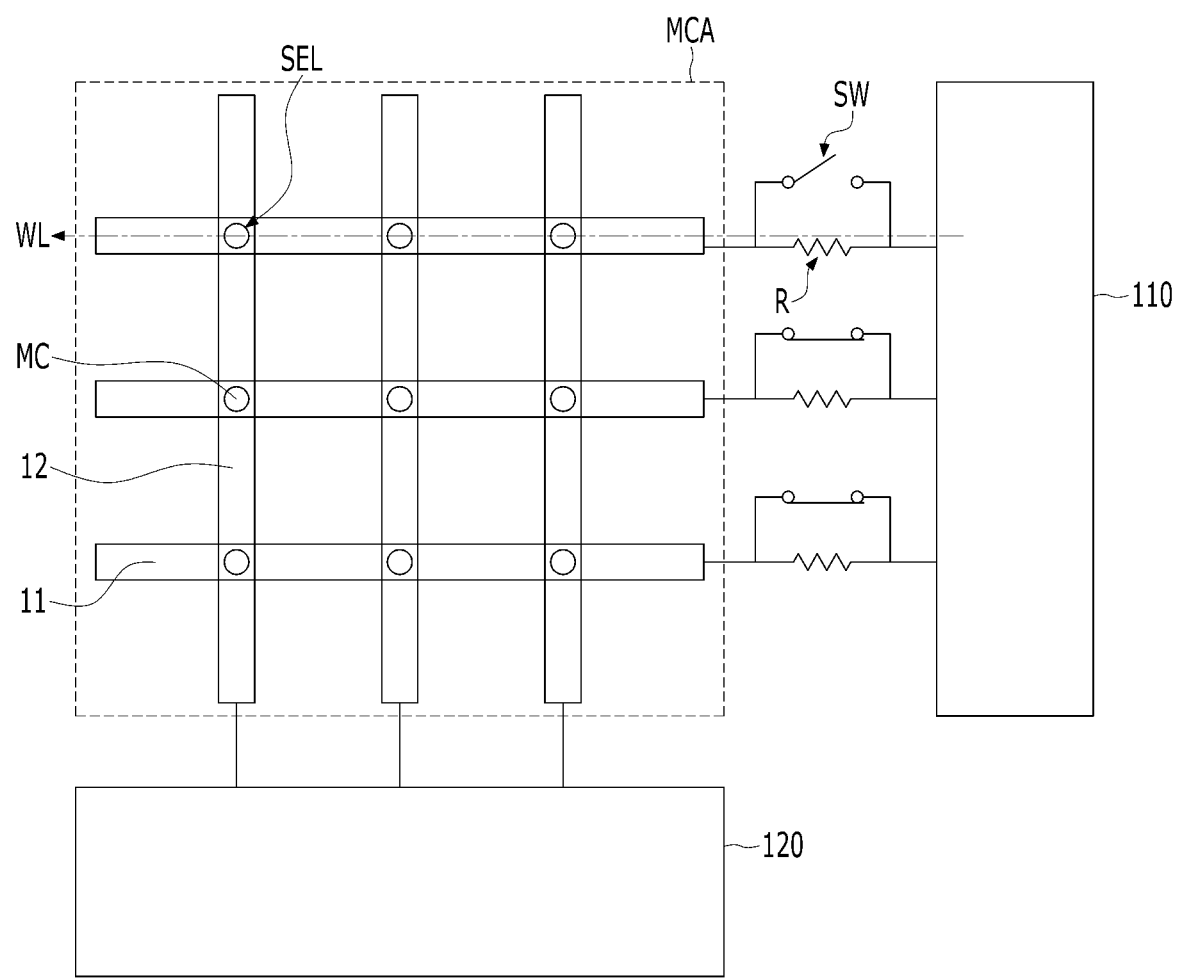
FIG. 7A illustrates a read operation for a selected memory cell in the semiconductor device shown in FIG. 5.
Figure 7B:
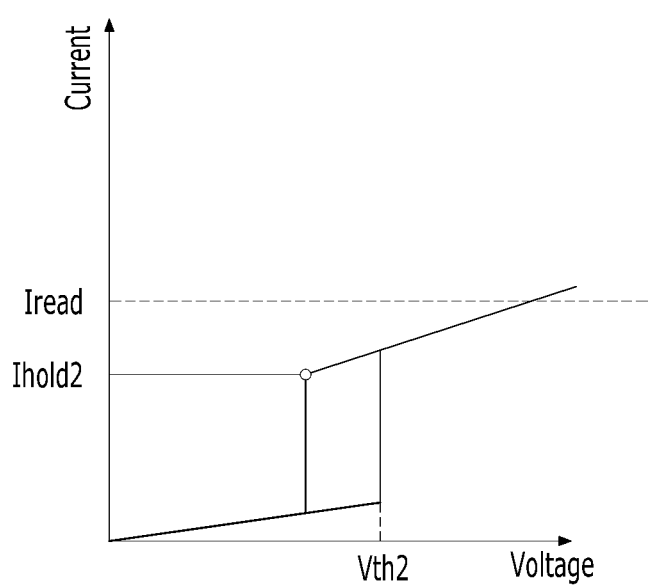
FIG. 7B is a current-voltage graph illustrating an operation of a selector layer of the selected memory cell during the read operation shown in FIG. 7A.

FIG. 7A illustrates a read operation for a selected memory cell in the semiconductor device shown in FIG. 5. FIG. 7B is a current-voltage graph illustrating an operation of the selector layer of the selected memory cell during the read operation illustrated in FIG. 7A.

Referring to FIG. 7A, the memory cell MC coupled to the uppermost first conductive line 11 and the leftmost second conductive line 12 may be referred to as a selected memory cell SEL. During a read operation for the selected memory cell SEL, by operations of the first and second drivers 110 and 120, a read voltage may be applied through the uppermost first conductive line 11 and the leftmost second conductive line 12. For example, a voltage corresponding to one half of the read voltage may be applied by a corresponding first driver 110 to the uppermost first conductive line 11, and a voltage corresponding to one half of the read voltage may be applied by a corresponding second driver 120 to the leftmost second conductive line 12. The ground voltage may be applied to the remaining first conductive lines 11 and the remaining second conductive lines 12 so that a read operation for the remaining memory cells MC may not be performed.

In some implementations, the switching element SW coupled to the uppermost first conductive line 11 may be turned off, as illustrated in FIG. 7A. Accordingly, a current may flow between the first driver 110 and the uppermost first conductive line 11 through the resistor R. In this case, since the selector layer of the selected memory cell SEL coupled to the uppermost first conductive line 11 is coupled to the resistor R, the hold current may be reduced.

In some implementations, the switching elements SW coupled to the remaining first conductive lines 11 may be turned on to supply the ground voltage to the remaining first conductive lines 11 that are not selected.

Referring to FIG. 7B, since the selected memory cell is coupled to the resistor, current-voltage characteristics are similar to those shown in FIG. 4. In other words, a second hold current Ihold2, which is relatively small, and an on-current may appear.

Since the read current Iread generally has a smaller value, e.g., a value smaller than that of the write current, it may have a value smaller than that of the hold current if the hold current is not reduced. For example, the read current Iread may have a value smaller than that of the first hold current Ihold1, as mentioned above. However, since the selected memory cell is coupled to the resistor so that the selector layer of the selected memory cell has the second hold current Ihold2 which is smaller than the first hold current Ihold1, the read current Iread may have a value which is greater than that of the second hold current Ihold2. Therefore, during a read operation of the selected memory cell, the oscillation phenomenon of the selector layer may be prevented and/or reduced. Also, since the read current Iread has a relatively small value, for example, a value which is smaller than that of the write current Iwrite, even though the on-current of the selector layer decreases, the read operation may not fail.

Although the above embodiment of the disclosed technology describes the case where the resistor R and the switching element SW are coupled to the first conductive line 11, the concept and spirit of the disclosed technology are not limited thereto. The resistor R and the switching element SW may be coupled to the second conductive line 12 or may be coupled to both of the first conductive line 11 and the second conductive line 12. This will be described below with reference to FIGS. 8 and 9.

Figure 8:
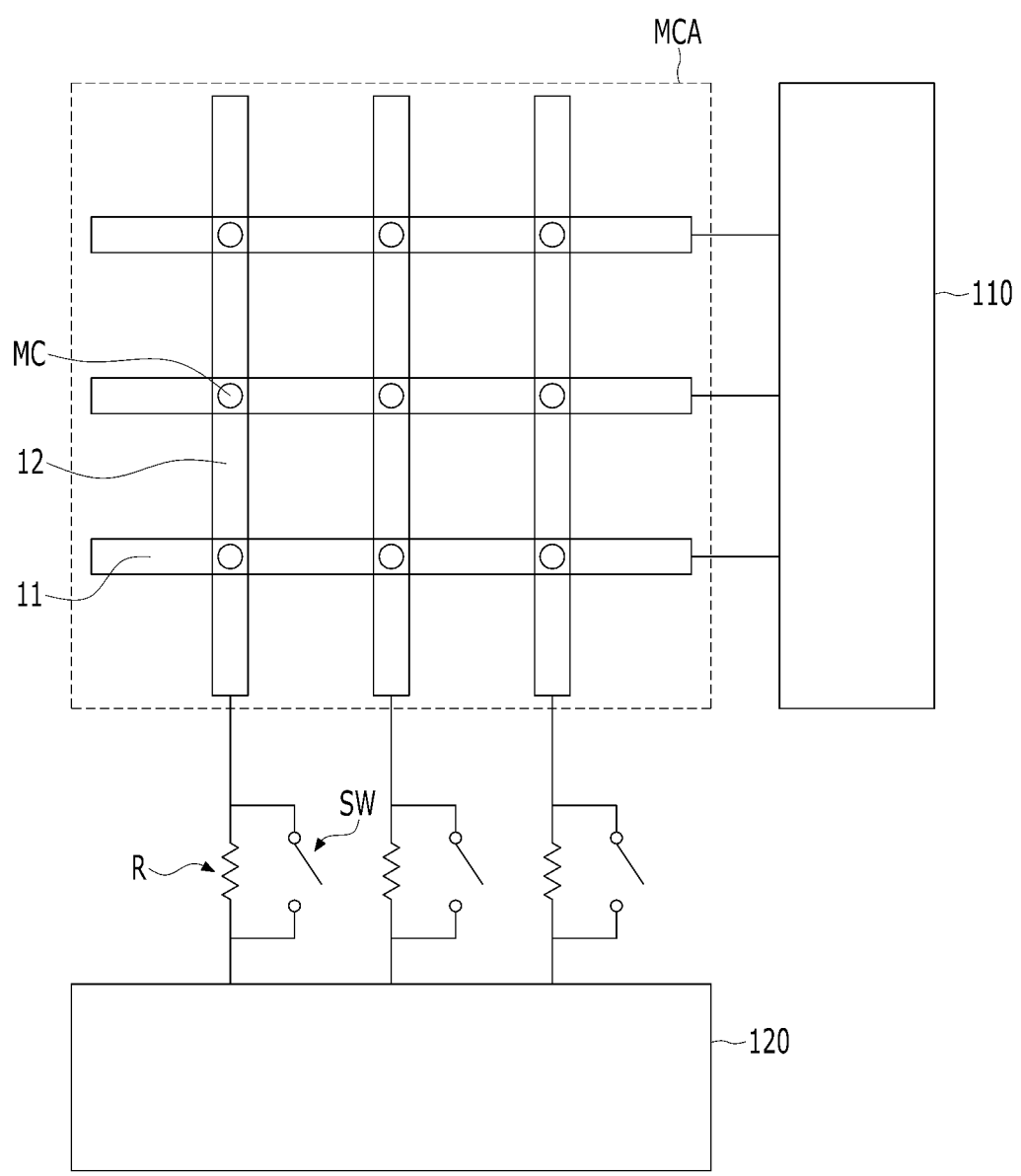
FIG. 8 illustrates a semiconductor device based on another embodiment of the disclosed technology.

FIG. 8 illustrates a semiconductor device based on another embodiment of the disclosed technology. Differences from the above-described semiconductor device of FIG. 5 and its operation will be mainly described.

Referring to FIG. 8, the semiconductor device of the embodiment of the disclosed technology may include a memory cell array MCA including a plurality of first conductive lines 11 extending in the first direction in parallel to each other, a plurality of second conductive lines 12 extending in the second direction in parallel to each other, and a plurality of memory cells MC interposed between the first conductive lines 11 and the second conductive lines 12, a first driver 110 coupled to the first conductive lines 11 to activate the first conductive lines 11, a second driver 120 coupled to the second conductive lines 12 to activate the second conductive lines 12, a plurality of resistors R respectively coupled to the second conductive lines 12 in series between the second conductive lines 12 and the second driver 120, and a plurality of switching elements SW respectively coupled in parallel to the resistors R between the second conductive lines 12 and the second driver 120. When viewed from above, the plurality of first conductive lines 11 extending in the first direction and the second conductive lines 12 extending in the second direction intersect at intersections where memory cells MC are disposed.

In some implementations of the semiconductor device, when the switching element SW is turned off, the second conductive line 12 may be coupled serially to the resistor R, and may be coupled to the second driver 120 through the resistor R. Thus, the voltage or current supplied through the second driver 120 may be transferred to the second conductive line 12 through the resistor R. As a result, the hold current of the selector layer of the memory cell MC which is coupled to the second conductive line 12 may be decreased.

On the other hand, when the switching element SW is turned on, the electrical connection between the second conductive line 12 and the resistor R may be blocked and coupled to the second driver 120 through the switching element SW. Thus, the voltage or current supplied through the second driver 120 may be transferred to the second conductive line 12 through the switching element SW. As a result, the hold current of the selector layer of the memory cell MC which is coupled to the second conductive line 12 may be substantially maintained.

When a write operation is performed for the selected memory cell MC, the switching element SW which is coupled to the selected second conductive line 12 may be turned on. In this case, since the selector layer of the selected memory cell MC is not coupled to the resistor R, the hold current may be maintained. Even though the hold current is maintained, since the write current is greater than the hold current, a normal write operation may be performed. In some implementations, the switching elements SW coupled to the remaining second conductive lines 12 that are not selected may be turned on.

On the other hand, during a read operation for the selected memory cell MC, the switching element SW which is coupled to the selected second conductive line 12 may be turned off. In this case, since the selector layer of the selected memory cell MC is coupled to the resistor R, its hold current may be reduced. Even though the read current is smaller than the write current, since it is easy to make the read current greater than the hold current by decreasing the hold current, a normal read operation may be performed. In some implementations, the switching elements SW coupled to the remaining second conductive lines 12 that are not selected may be turned on.

Figure 9:
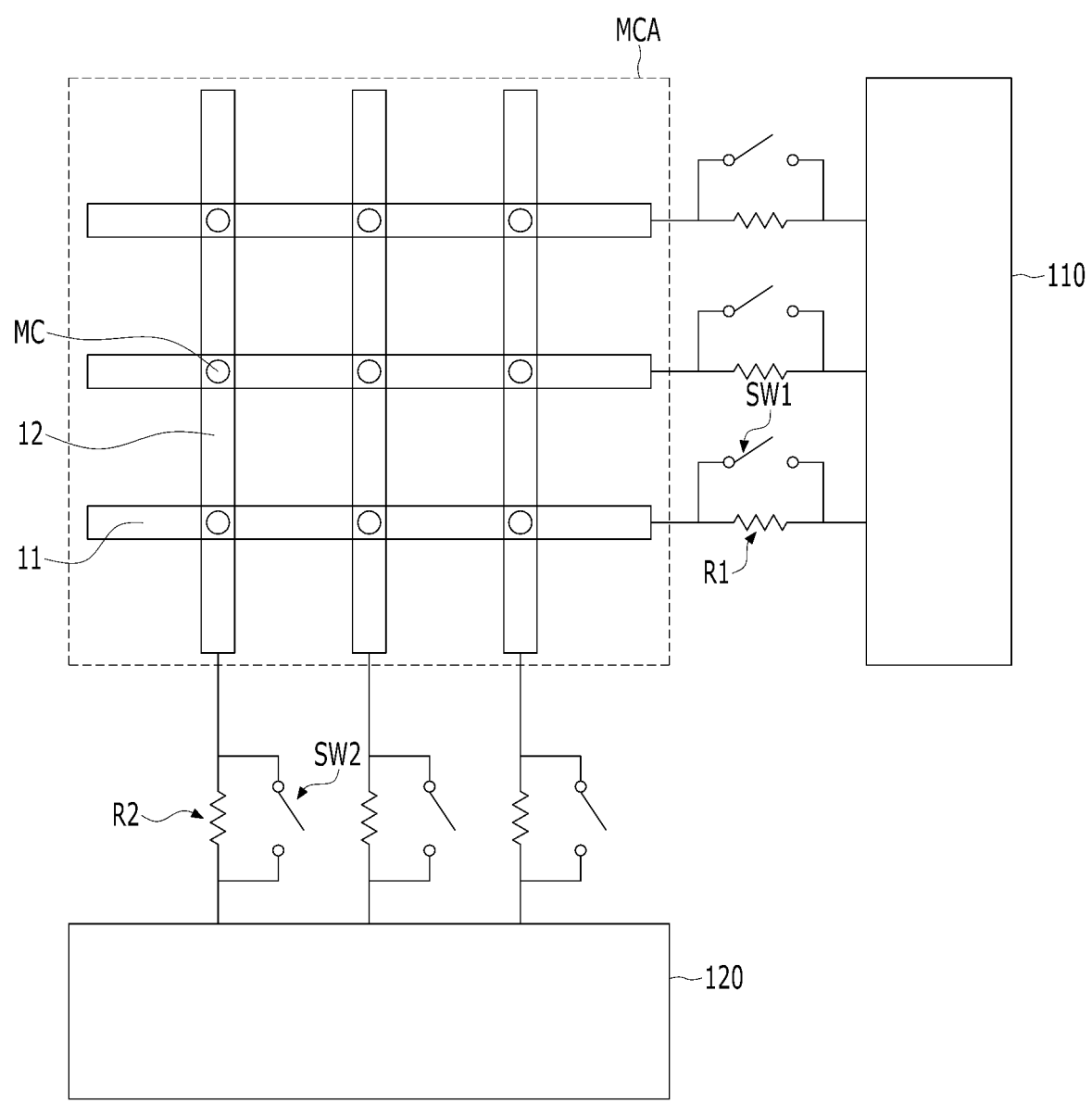
FIG. 9 illustrates a semiconductor device based on another embodiment of the disclosed technology.

FIG. 9 illustrates a semiconductor device based on another embodiment of the disclosed technology. As will be discussed below, the semiconductor device illustrated in FIG. 9 have some differences from the above-described semiconductor device of FIG. 5.

Referring to FIG. 9, the semiconductor device based on an embodiment of the disclosed technology may include a memory cell array MCA including a plurality of first conductive lines 11 extending in the first direction in parallel to each other, a plurality of second conductive lines 12 extending in the second direction in parallel to each other, and a plurality of memory cells MC interposed between the first conductive lines 11 and the second conductive lines 12, a first driver 110 coupled to the first conductive lines 11 and driving the first conductive lines 11, a second driver 120 coupled to the second conductive lines 12 to activate the second conductive lines 12, a plurality of first resistors R1 respectively coupled to the first conductive lines 11 in series between the first conductive lines 11 and the first driver 110, and a plurality of first switching elements SW1 coupled in parallel to the first resistors R1 between the first conductive lines 11 and the first driver 110, a plurality of second resistors R2 respectively coupled to the second conductive lines 12 in series between the second conductive lines 12 and the second driver 120, and a plurality of second switching elements SW2 coupled in parallel to the second resistors R2 between the second conductive lines 12 and the second driver 120. When viewed from above, the plurality of first conductive lines 11 extending in the first direction and the second conductive lines 12 extending in the second direction intersect at intersections where memory cells MC are disposed.

In some implementations of the semiconductor device, when the first switching element SW1 is turned off, the first conductive line 11 may be coupled serially to the first resistor R1 and coupled to the first driver 110 through the first resistor R1. As a result, the hold current may be decreased.

On the other hand, when the first switching element SW1 is turned on, the electrical connection between the first conductive line 11 and the resistor R1 may be cut off, and the first conductive line 11 may be coupled to the first driver 110 through the first switching element SW1. As a result, the hold current may be maintained.

Also, when the second switching element SW2 is turned off, the second conductive line 12 may be coupled in series to the second resistor R2 and coupled to the second driver 120 through the second resistor R2. As a result, the hold current may be decreased.

On the other hand, when the second switching element SW2 is turned on, the electrical connection between the second conductive line 12 and the second resistor R2 may be cut off, and the second conductive line 12 may be coupled to the second driver 120 through the second switching element SW2. As a result, the hold current may be maintained.

When a write operation is performed for the selected memory cell MC, the first switching element SW1 coupled to the selected first conductive line 11 and the second switching element SW2 coupled to the selected second conductive line 12 may be turned on. In this case, since the selector layer of the selected memory cell MC is not coupled to the first and second resistors R1 and R2, the hold current may be maintained. Even though the hold current is maintained, since the write current is likely to be greater than the hold current, a normal write operation may be performed. The first and second switching elements SW1 and SW2 coupled to the remaining first and second conductive lines 11 and 12 that are not selected may be turned on.

On the other hand, during a read operation for the selected memory cell MC, at least one of the first switching element SW1 coupled to the selected first conductive line 11 and the second switching element SW2 coupled to the selected second conductive line 12 may be turned off. In other words, at least one of a first case where only the first switching element SW1 is turned off, a second case where only the second switching element SW2 is turned off, and a third case where both of the first switching element SW1 and the second switching element SW2 are turned off may be possible. Since the selector layer of the selected memory cell MC is coupled to at least one of the first resistor R1 and the second resistor R2, the hold current may be decreased. Even if the read current is smaller than the write current, since it is easy to make the read current greater than the hold current by decreasing the hold current, a normal read operation may be performed. The first and second switching elements SW1 and SW2 coupled to the remaining first and second conductive lines 11 and 12 that are not selected may be turned on.

In some implementations, the first to third cases may be selectively performed in consideration of the size of the read current. In the third case, the hold current of the selector layer may be more decreased than the first case and the second case. Therefore, in the case where the read current is relatively small and the hold current needs to be decreased more significantly, the third case may be performed. On the other hand, in the case where the read current is relatively great and the hold current needs to be decreased less significantly, either the first case or the second case may be performed.

In some embodiments of the disclosed technology, since the extent of the decrease in the hold current of the selector layer may be adjusted in consideration of the magnitude of the read current, the read operation may be more precisely controlled.

In some embodiments of the disclosed technology, it is possible to reduce or prevent an operation failure of a memory cell.

While the disclosed technology has been described with respect to the specific embodiments, it should be understood that various enhancements and modifications of the disclosed embodiments and other embodiments may be made based on what is described and illustrated in this patent document.

What is claimed is:

1. A semiconductor device, comprising:
    a memory cell array including a plurality of first conductive lines extending in a first direction, a plurality of second conductive lines extending in a second direction, and a plurality of memory cells disposed at intersections between the first conductive lines and the second conductive lines;
    a first driver coupled to the first conductive lines and configured to drive the first conductive lines;
    a second driver coupled to the second conductive lines and configured to drive the second conductive lines;
    a first resistor coupled in series to each of the first conductive lines and between the first driver and the first conductive lines; and
    a first switching element coupled in a conductive path that is in parallel to the first resistor and is between the first driver and the first conductive lines and operable to turn on or off the conductive path,
    wherein the first and second drivers are configured so that, upon performing a write operation on a selected memory cell of the memory cells, the first switching element coupled to a selected first conductive line among the first conductive lines is turned on, and
    upon performing a read operation on the selected memory cell, the first switching element coupled to the selected first conductive line is turned off.

2. The semiconductor device of claim 1, wherein each of the memory cells includes a selector layer that exhibits an on-state to conduct a current and an off state that blocks the current, and
    a hold current of the selector layer for maintaining the selector layer in the on-state during the write operation is greater than a hold current of the selector layer for maintaining the selector layer in the on-state during the read operation.

3. The semiconductor device of claim 1, wherein the first and second drivers are configured so that, during the write operation, an electrical connection between the selected memory cell and the first resistor is blocked, and
    during the read operation, the selected memory cell is coupled to the first resistor.

4. The semiconductor device of claim 1, wherein a write current flowing through the selected memory cell during the write operation is greater than a read current flowing through the selected memory cell during the read operation.

5. The semiconductor device of claim 1, wherein during the write operation and the read operation, the first switching element coupled to an unselected first conductive line of the first conductive lines is turned on.

6. The semiconductor device of claim 1, wherein the first resistor has a smaller resistivity than a resistivity of the first conductive lines.

7. The semiconductor device of claim 1, further comprising:
    a second resistor coupled in series to each of the second conductive lines between the second driver and the second conductive lines; and
    a second switching element coupled in parallel to the second resistor between the second driver and the second conductive lines.

8. The semiconductor device of claim 7, wherein the first and second drivers are configured so that, upon performing a write operation on a selected memory cell among the memory cells, the first switching element coupled to a selected first conductive line of the first conductive lines and the second switching element coupled to a selected second conductive line of the second conductive lines are turned on, and
    upon performing a read operation on the selected memory cell, at least one of the first switching element coupled to the selected first conductive line and the second switching element coupled to the selected second conductive line is turned off.

9. The semiconductor device of claim 8, wherein each of the memory cells includes a selector layer that exhibits an on-state to conduct a current and an off state that blocks the current, and
    a hold current of the selector layer for maintaining the selector layer in the on-state during the write operation is greater than a hold current of the selector layer for maintaining the selector layer in the on-state during the read operation.

10. The semiconductor device of claim 8, wherein the first and second drivers are configured so that, during the write operation, an electrical connection between the selected memory cell and the first resistor and an electrical connection between the selected memory cell and the second resistor are blocked, and
    during the read operation, the selected memory cell is coupled to at least one of the first resistor and the second resistor.

11. The semiconductor device of claim 8, wherein a write current flowing through the selected memory cell during the write operation is greater than a read current flowing through the selected memory cell during the read operation.

12. The semiconductor device of claim 8, wherein the first and second drivers are configured so that, during the write operation and the read operation, the first switching element coupled to an unselected first conductive line among the first conductive lines and the second switching element coupled to an unselected second conductive line among the second conductive lines are turned on.

13. The semiconductor device of claim 7, wherein the second resistor has a smaller resistivity than a resistivity of the second conductive lines.

14. The semiconductor device of claim 1, wherein the first and second drivers are configured so that the first switching element is selectively turned on or off according to an operation mode.

15. The semiconductor device of claim 7, wherein the first and second drivers are configured so that the first and second switching elements are selectively turned on or off according to an operation mode.

16. A semiconductor device, comprising:
a memory cell array including a plurality of first conductive lines extending in a first direction, a plurality of second conductive lines extending in a second direction, and a plurality of memory cells disposed at intersections between the first conductive lines and the second conductive lines, each memory cell including a selector layer; and
a first resistor selectively coupled to an end of each of the first conductive lines,
wherein upon performing a write operation on a selected memory cell of the memory cells, an electrical connection between the first resistor and a selected first conductive line of the first conductive lines is blocked; and
when a read operation is performed for the selected memory cell, the first resistor is coupled to the selected first conductive line.

17. The semiconductor device of claim 16, further comprising:
a second resistor selectively coupled to an end of each of the second conductive lines.

18. The semiconductor device of claim 17, wherein upon performing a write operation on a selected memory cell of the memory cells, an electrical connection between the first resistor and a selected first conductive line of the first conductive lines is blocked, and an electrical connection between the second resistor and a selected second conductive line of the second conductive lines is blocked, and
upon performing a read operation on the selected memory cell, one of a first operation, a second operation, and a third operation is performed, wherein the first operation is performed to couple the first resistor to the selected first conductive line, the second operation is performed to couple the second resistor to the selected second conductive line, and the third operation is performed to couple the first resistor to the selected first conductive line and to couple the second resistor to the selected second conductive line.

* * * * *